United States Patent [19]

Dau et al.

[11] 3,789,967
[45] Feb. 5, 1974

[54] CLUTCH ASSEMBLY FOR A VEHICLE

[75] Inventors: Wolfram Dau; Paul Langer; Hans Gritzan, all of Wolfsburg, Germany

[73] Assignee: Volkswagenwerk Aktiengesellschaft, Wolfsburg

[22] Filed: Dec. 1, 1972

[21] Appl. No.: 311,103

[30] Foreign Application Priority Data
Dec. 4, 1971 Germany.................. P 21 60 278.8

[52] U.S. Cl. ............................. 192/111 A, 74/512
[51] Int. Cl. ............................................ F16d 13/75
[58] Field of Search ... 192/111 A; 188/71.8; 74/512

[56] References Cited
UNITED STATES PATENTS

| 2,036,004 | 3/1936 | Wemp............................ 192/111 A |
| 2,073,705 | 3/1937 | Moorhouse..................... 192/111 A |
| 3,199,366 | 8/1965 | Herrington, Jr. ..................... 74/512 |
| 3,250,357 | 5/1966 | Zeidler............................ 192/111 A |

Primary Examiner—Leonard H. Gerin
Assistant Examiner—Lance W. Chandler
Attorney, Agent, or Firm—Brumbaugh, Graves, Donohue & Raymond

[57] ABSTRACT

An interlocking device for a clutch that utilizes an actuating mechanism containing a clutch cable and clutch pedal, the interlocking device being designed to automatically adjust the actuating mechanism for friction lining wear and cable elongation, when the clutch pedal is in its rest position. The interlocking device includes a gripping member which is coupled to the clutch pedal and which is adapted to be pivoted about an axis when the pedal is depressed to disengage the clutch. The gripping member has an opening formed therein in which a spring-mounted pin rides. This pin, which is coupled to the pedal end of the clutch cable, enjoys a certain degree of play in the opening when the clutch pedal is at its rest position, so that it will automatically be moved, under the spring force, relative to the gripping member by a distance and in a direction appropriate to compensate for cable elongation and lining wear. When the clutch pedal is depressed, the gripping member pivots relative to the pin to cause wall portions of the opening to grip the pin in tight frictional engagement to prevent movement thereof and allow for proper actuation of the clutch.

15 Claims, 7 Drawing Figures

CLUTCH ASSEMBLY FOR A VEHICLE

BACKGROUND OF THE INVENTION

1. Field of the Invention

The invention concerns an interlocking device for a frictional clutch which uses an actuating mechanism containing a clutch cable and clutch pedal. When the clutch is at its rest position abutting a stop, the interlocking device automatically adjusts the actuating mechanism of the clutch to a predetermined position which compensates for lining wear of the clutch and elongation of the clutch cable.

2. Description of the Prior Art

German patent No. 444,779 discloses a prior art interlocking arrangement which utilizes a hydraulic or pneumatic auxiliary device to automatically set the point of application of a manually pre-tightened level on the structure which is moved by the auxiliary device. The interlocking device used with this type of prior construction, however, is clostly and is prone to breaking down. In addition, the adjustment feature is specifically designed to eliminate deficiencies which normally occur in actuating devices operating with an auxiliary force. It is adjustable in a single direction only, upon actuation of the pedal, and then only when the fully actuated position is reached and either the friction lining has been worn off or the cable lines have been elongated. Thus it affords neither adjustment for intermediate degrees of lining wear or cable elongation, nor the capability of simultaneous adjustment for both of these factors, they requiring adjustment in opposite directions.

SUMMARY OF THE INVENTION

It is a purpose of the present invention to provide for an interlocking mechanism which can automatically compensate for the friction lining wear as well as cable elongation which normally occurs in a friction clutch.

A further object of the invention is to provide an interlocking device that now only has a simple structure and ensures operation free of disturbance but also facilitates adjustment in two opposite directions to remedy cable elongation and friction lining wear, respectively.

These objects are fulfilled by provision of a gripping member which can be pivoted by means of actuation of the clutch pedal and which has an opening formed therein that is traversed with play by a pin member attached to the pedal end of the clutch cable. The pin member is acted upon by a resilient means in an axial direction towards its free end. A stop locates the gripping member when the clutch pedal is at the rest position such that the opening is in generally axial alignment with the pin member, which is thus free to move relative to the gripping member, under the force of the resilient means, to adjust the point of engagement therebetween for cable elongation and friction lining wear. The angular relationship of the opening axis to that of the pin member is, therefore, determined only by the stop when the clutch pedal is in the rest position. When the clutch pedal is actuated, the gripping member pivots and opposed wall portions of the opening come into frictional engagement with the pin member to hold the pin at a set position within the opening. The inclination of the axis of the opening at this position is determined only by the contact points of the opposed wall portions of the opening with the pin member.

The gripping member may be formed integrally with the shaft associated with the clutch pedal. It is thereby possible to provide the clutch pedal shaft with a projection extending in an axial direction and containing the opening which accommodates the pin. A further embodiment of the invention comprises having a gripping member in the shape of a separate lever which is attached to the clutch pedal shaft and pivots coaxially therewith.

The gripping member may also be connected with either the clutch pedal or its mounting shaft by means of intermediary linkage. This may include a single link fixedly connected with the clutch pedal shaft at one end and hinged to the gripping member at the other end. An alternate construction has the intermediary link in the shape of a rod with one of its ends joined to the clutch pedal and the other end coupled to the gripping member. Moreover, it is possible to have the intermediary linkage comprise two levers, with the first lever being fixedly connected with the clutch pedal shaft at one end and at its other end with the second lever through a jointed connection. The gripping member is pivoted to the other end of the second lever.

The pin can be guided either in stationary sleeves or can be axially movable on one of the two levers constituting the intermediary linkage. It can also be provided with teeth which mesh with a wall portion of the gripping member opening to provide for secure frictional engagement. If desired, a compression spring can be placed between the gripping member and a thrust support arranged on the pin.

The invention also provides for an embodiment in which the pin member is generally L-shaped at the end facing the clutch cable, with the cable being connected to the end of the adjacent leg of the pin. The spring in such an embodiment is designed as a tension spring and is positioned between the same pin leg and a holder attached to the clutch pedal or its mounting shaft. Either an articulated or a disengageable connection, or both, can be employed between the pin and the end of the clutch cable.

DESCRIPTION OF THE DRAWINGS

The invention may be further understood by referring to the drawings which form a portion of the specification and which are appended hereto, wherein.

DESCRIPTION OF CERTAIN PREFERRED EMBODIMENTS OF THE INVENTION

Figure 1:
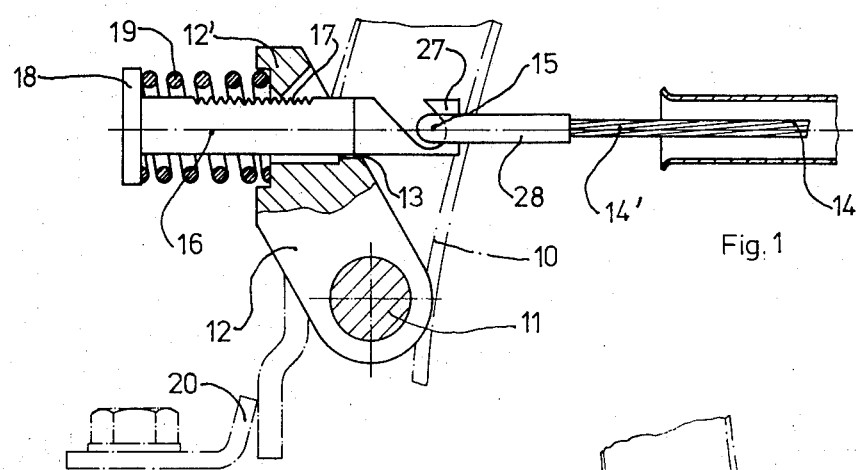
FIG. 1 is a side view of one embodiment of the present invention, partly in section, with the clutch pedal in the rest position, i.e., with the clutch engaged.
Figure 2:
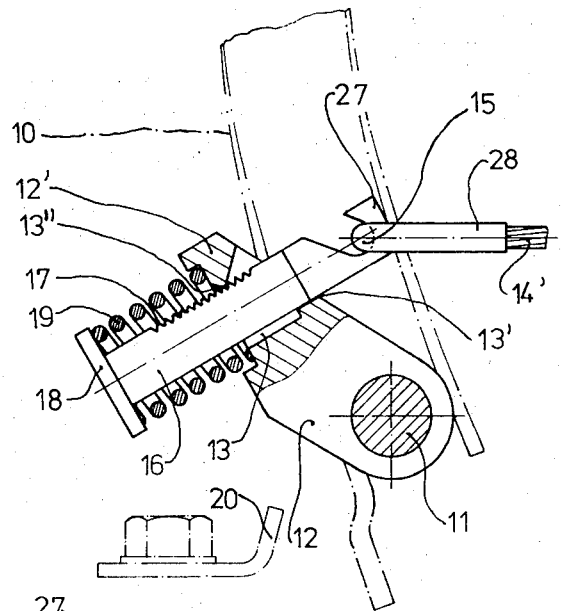
FIG. 2 is a side view of the embodiment of FIG. 1 with the clutch pedal depressed to disengage the clutch.

The exemplary embodiment of the invention shown in FIGS. 1 and 2 comprises a gripping member 12 fastened on a mounting shaft 11 associated with the clutch pedal 10. The pedal 10 and shaft 11 are fixed together for synchronous rotation upon manipulation of the pedal. An opening 13 formed in the member 12 is traversed with play by a pin 16 connected at the pedal end 14' of the clutch cable 14 by means of an articulated and disengageable link 15. For example, the link 15 may be designed as a hook and eye link.

The pin 16 preferably is provided with a series of teeth 17 for engagement with the gripping member 12, as is explained more fully hereinafter. Between the member 12 and a flange-like thrust support or abutment 18 arranged on the pin 16 is a compression spring 19 which urges the pin 16 away from the cable 14 so as to apply tensile force to the cable.

When the clutch pedal 10 is in its rest position (see FIG. 1), the position of the gripping member 12, and hence of the opening 13, with respect to the pin 16 is determined by a stop 20. This is so arranged that the opening is generally in axial alignment with the pin 16. The pin 16 is thus freely movable in an axial direction with respect to the gripping member 12. Accordingly, the desired tension may be maintained on the clutch cable and, at the same time, any necessary compensation for cable elongation and friction lining wear is automatically provided. It will be understood that the force of the compression spring 19 also acts on the following release bearing (not shown) of the clutch.

When the clutch pedal 10 is manipulated, i.e., depressed (see FIG. 2), the gripping member 12 rotates with it, so that the opening is moved out of alignment with the pin 16. This causes the opposed wall portions 13' and 13" at the edge of the opening to frictionally engage the pin 16. The frictional engagement may be further enhanced by shaping the wall portion 13" on the outer part 12' of gripping member 12 to coact with the teeth 17 on the pin member 16. This frictional engagement between the opening walls and the pin member 16 prevents slippage of pin 16 during actuation of the clutch pedal 10 and ensures proper operation of the clutch assembly. That is to say, when the clutch pedal is depressed, the gripping member 12 initially pivots with the shaft 11 until the opening wall portions engage the pin member 16. Depression and subsequent manipulation of the clutch pedal beyond this point results in movement of the cable 14 and thus the desired actuation of the clutch. Of course, when the pedal is returned to the rest position of FIG. 1, adjustment for cable elongation and lining wear again takes place automatically.

Figure 3:
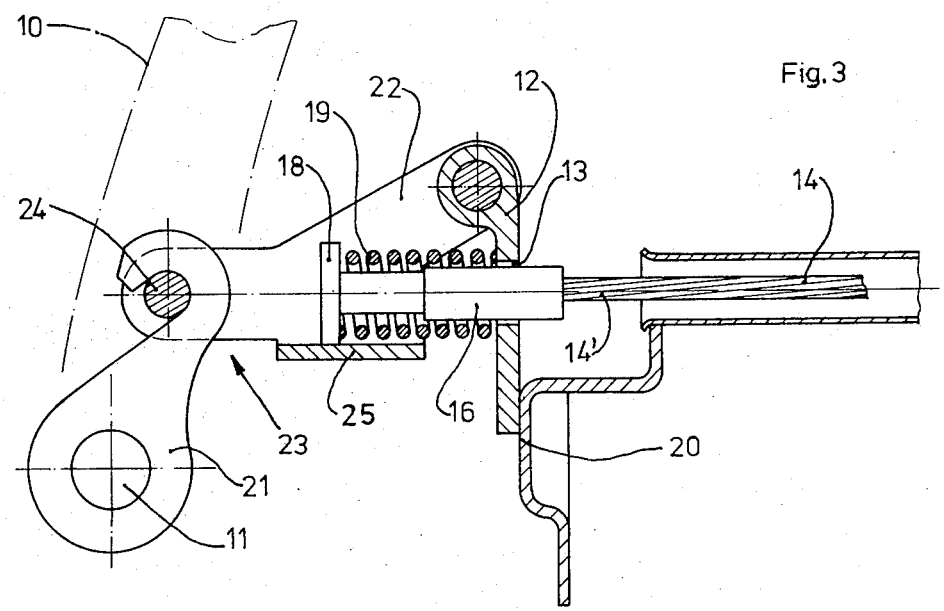
FIG. 3 is a side view of another embodiment of the invention, partly in section, with the clutch engaged.
Figure 4:
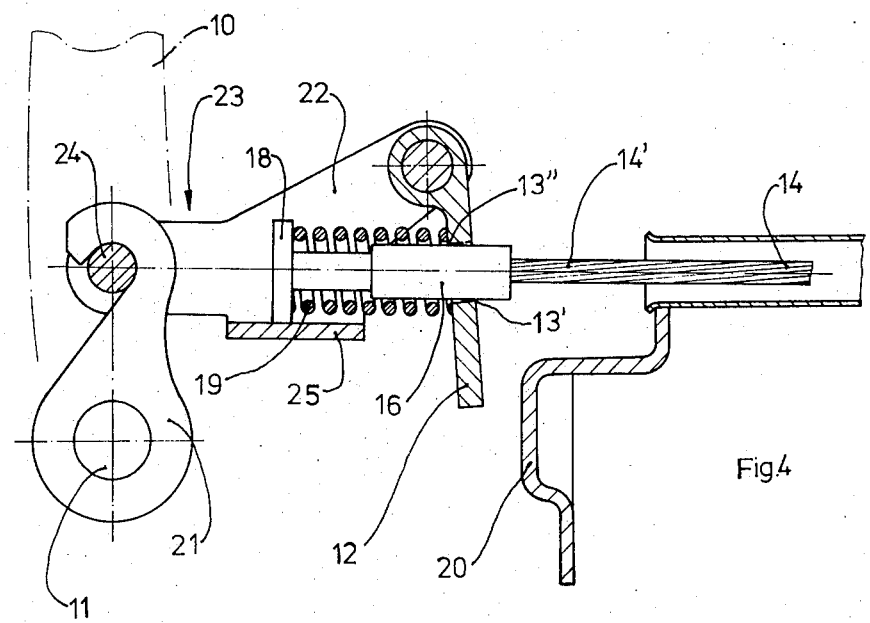
FIG. 4 depicts the embodiment of FIG. 3 with the clutch disengaged.

Another embodiment of the invention is shown in FIGS. 3 and 4. The gripping member 12 in this embodiment is connected with the clutch pedal shaft 11 by means of intermediary linkage 23 comprising two levers 21 and 22, respectively. The first lever 21 is connected at one end with the clutch pedal shaft 11 for rotation therewith and at the other end to the second lever 22 by means of an articulated joint 24. The end of the second lever 22 facing away from the first lever 21 is articulated to the gripping member 12. The member 12 rests against the stop 20 when the clutch pedal 10 is not actuated, as shown in FIG. 3. So located, the position of the opening 13 with respect to the pin 16 is such that the pin 16 is free to move in an axial direction in relation to the gripping member 12 under the force of the spring 19. When the clutch pedal 10 is actuated, as shown in FIG. 4, the facing wall portions 13' and 13" of the edge of the opening bear against the pin 16 and thereafter move the cable 14 along with the clutch pedal 10. A guide 25 is positioned on the second lever 22 to support the pin in relation to the gripping member and to guide its axial movement when the clutch pedal is in the rest position (see FIG. 3).

Figure 5:
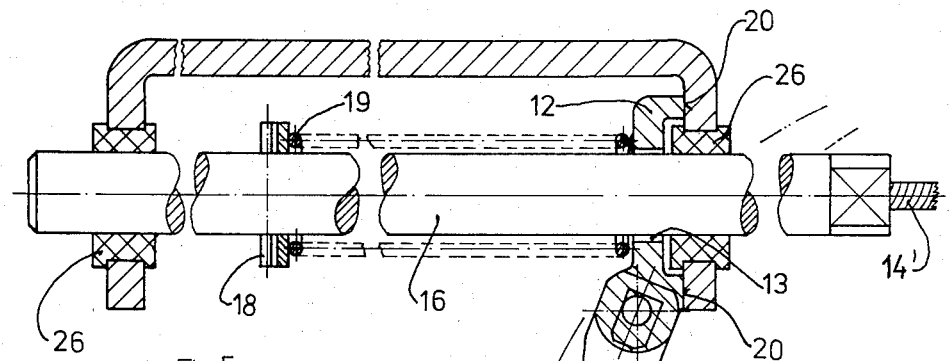
FIG. 5 is a side view of yet another embodiment of the present invention, partly sectioned, with the clutch engaged.
Figure 6:
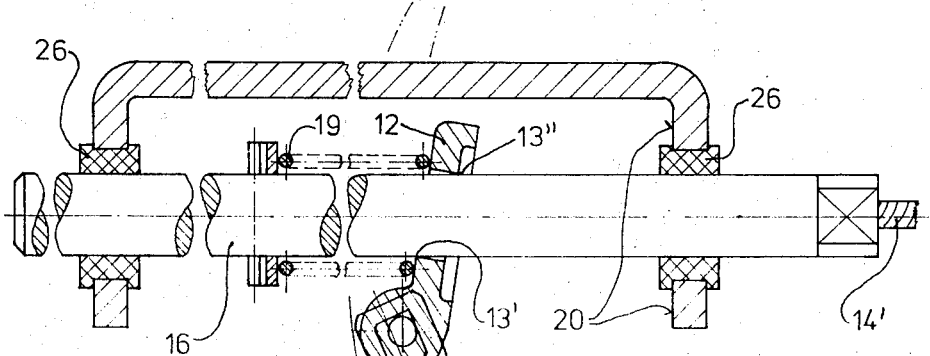
FIG. 6 is a side view of the embodiment of FIG. 5 with the clutch disengaged.

Another embodiment of the invention is shown in FIGS. 5 and 6. In this embodiment, the gripping member 12 is connected with the clutch pedal shaft 11 by means of an intermediary link 23 which is attached at one end to the clutch pedal shaft 11 and which at the other end is articulated to the gripping member 12. The pin 16 is guided in stationary bushes 26 and is movable in an axial plane only. The member 12 rests against the stop 20 when the clutch is engaged, i.e., when the clutch pedal 10 is not actuated (see FIG. 5), leaving the pin 16 freely movable in the opening 13. The spring 19, acting between the member 12 and an abutment 18 on the pin, provides for the appropriate compensating movement of the pin 16 to account for lining wear and cable elongation.

Upon manipulation of the clutch pedal 10, as shown in FIG. 6, the member 12 tilts with respect to the pin 16, thereby causing opening wall portions 13' and 13" to engage the pin. This frictional connection with the pin 16 is maintained until the member 12, upon full engagement of the clutch, again comes to rest against the stop 20.

Figure 7:
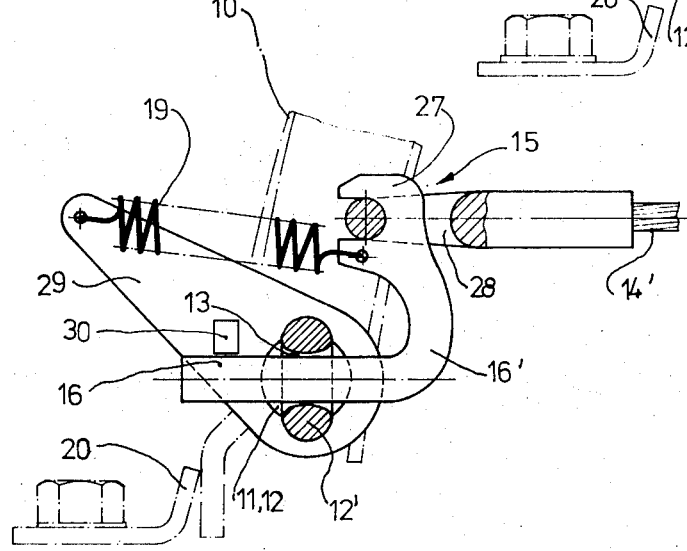
FIG. 7 is a side view of another embodiment of the present invention, also partly in section, with the clutch engaged.

FIG. 7 illustrates another form of the invention, one in which the gripping member 12 comprises a portion of the shaft 11 associated with the clutch pedal 10. In the particular embodiment depicted, the shaft 11 is provided with an axially extending projection 12' which contains the opening 13 for the pin 16. The pin 16 is generally L-shaped, with cable end 14' being coupled to a hook 27 at the end of the leg 16'. Conveniently, an eye hook 28 is provided on the cable end 14' to facilitate engagement and disengagement of the cable with the pin 16. In this instance, the spring 19 is a tension spring and is placed between the pin leg 16' and a holder member 29 attached to the clutch pedal shaft 11. A guide 30, preferably resilient in nature, is provided on the holder 29 for guiding axial movement of the pin in response to the spring 19.

The construction illustrated in FIG. 7 operates according to the same principle as the other embodiments described above. When the clutch pedal 10 is at rest, i.e., not actuated, the pin 16 is freely movable axially in the opening 13. When the clutch pedal 10 is actuated, the gripping member 12' is pivoted, clamping the pin 16 in the opening 13 to form a frictional connection between the clutch pedal 10 and the clutch cable 14 which will not slip. Damage to the clutch due to excessive tightening caused by worn-off friction linings is avoided by the spring-like action of pin leg 16'. Moreover, all tolerances occurring through the different lever arms between the clutch pedal shaft and the takeup of the clutch cable are compensated by the embodiment.

Although the invention has been described herein by reference to specific embodiments thereof, various modifications and variations of such embodiments may be made by one skilled in the art without departing from the inventive concepts disclosed. All such modifications and variations, therefore, are intended to be included within the spirit and scope of the appended claims.

We claim:

1. In an actuating mechanism for the clutch of a motor vehicle including a clutch pedal, a clutch cable, and means coupling the clutch pedal and the clutch cable together for effecting engagement and disengagement of the clutch upon manipulation of the clutch pedal, the improvement comprising:

a gripping member having an opening formed therein;

a pin member coupled to the pedal end of the clutch cable and being received in the opening of the gripping member;

means coupling the gripping member to the clutch pedal for pivotal movement of the chamber about an axis, upon manipulation of the pedal, from a predetermined position in which the gripping member opening is generally in axial alignment with the pin member and an actuated position in which the opening and the pin member are axially non-aligned;

means for resiliently urging the pin member in a direction away from the clutch cable so as to apply axial tensile force to the clutch cable; and stop means for locating the gripping member at said predetermined position relative to the pin member when the clutch pedal is in the rest position;

the cross-sections of the gripping member opening and the pin member being dimensioned such that (1) when the gripping member is at said predetermined position the pin member is free to move axially within the opening in response to the resilent urging means, thereby automatically to compensate for wear of the frictional elements of the clutch and for elongation of the clutch cable, and (2) when the clutch pedal is depressed to move the gripping member to said actuated position, the pin member is held against axial movement relative to the gripping member by engagement of opposed wall portions of the opening with the pin member, thereby to effect movement of the clutch cable in response to further manipulation of the clutch pedal beyond said actuated position of the gripping member.

2. The mechanism of claim 1 wherein the pin member is formed with teeth means on the surface thereof for engagement with the opposed wall portion of the opening upon depression of the clutch pedal.

3. The mechanism of claim 1 wherein:

the free end of the pin member extends through the gripping member; and the resilient urging means comprises a compression spring interposed between the free end of the pin member and the facing surface of the gripping member.

4. The mechanism of claim 1 wherein the pin member is coupled to the cable by means permitting articulation therebetween.

5. The mechanism of claim 1 wherein the pin member is coupled to the cable by means permitting uncoupling thereof.

6. The mechanism of claim 1 wherein:

the means coupling the gripping member to the clutch pedal includes a shaft for rotatably supporting the clutch pedal, the shaft and pedal being fixed together for rotation in synchronism upon manipulation of the pedal; and the gripping member comprises a portion of the shaft.

7. The mechanism of claim 6 wherein the gripping member comprises an axially extending projection of the pedal shaft, the opening being formed in said projection through the axis of the shaft.

8. The mechanism of claim 7 wherein the resilient urging means comprises:

a holder member mounted for rotation with the clutch pedal in fixed relation to the gripping member; and a tension spring connected between the holder member and the pin member for applying said tensile force to the clutch cable.

9. The mechanism of claim 8 wherein:

the pin member is generally L-shaped, one leg of which is received in the gripping member opening and the other leg of which is coupled to the cable;

the holder member is carried by the pedal shaft fo rotation therewith; and the tension spring is connected at one end to said other leg of the pin member.

10. The mechanism of claim 9 further comprising means carried by the holder member for guiding movement of the pin member relative to the gripping member when the gripping member is at said predetermined position.

11. The mechanism of claim 1 wherein:

the means coupling the gripping member to the clutch pedal includes a shaft for rotatably supporting the clutch pedal, the shaft and pedal being fixed together for rotation in synchronism upon manipulation of the pedal; and the gripping member comprises a radially extending member carried by the pedal shaft for rotation coaxially therewith, the opening being formed in a radially outer portion of the radially extending member.

12. The mechanism of claim 1 wherein the means coupling the gripping member to the clutch pedal comprises:

a shaft for rotatably supporting the clutch pedal, the shaft and pedal being fixed together for rotation in synchronism upon manipulation of the pedal;

a linking member carried by he shaft for rotation therewith; and means connecting the linking member to the gripping member for imparting said pivotal movement thereto upon manipulation of the clutch pedal.

13. The mechanism of claim 12 further comprising stationary sleeve means for constraining movement of the pin member to the axial plane; and wherein the coupling means, upon further manipulation of the clutch pedal beyond said actuated position, moves the pin member in the axial plane to effect movement of the clutch cable.

14. The mechanism of claim 1 wherein the means coupling the gripping member to the clutch pedal comprises:

a shaft for rotatably supporting the clutch pedal, the shaft and pedal being fixed together for rotation in synchronism upon manipulation of the pedal;

a first linking member carried by the pedal shaft for rotation therewith; and a second linking member pivotally coupled at one end to the first linking member and at the other end to the gripping member.

15. The mechanism of claim 14 wherein the means coupling the gripping member to the pedal shaft further comprises means carried by the second linking member for supporting the pin member relative to the gripping member and for guiding axial movement of the pin member when the gripping member is at said predetermined position.

* * * * *